United States Patent [19]

Kawakita et al.

[11] Patent Number: 4,514,223
[45] Date of Patent: Apr. 30, 1985

[54] CONTINUOUS DIRECT PROCESS OF LEAD SMELTING

[75] Inventors: Shizuo Kawakita, Kagawa; Takeyoshi Shibazaki, Tokyo; Hiromi Mochida, Saitama, all of Japan

[73] Assignee: Mitsubishi Kinzoku Kabushiki Kaisha, Tokyo, Japan

[21] Appl. No.: 603,639

[22] Filed: Apr. 25, 1984

[30] Foreign Application Priority Data

May 2, 1983 [JP] Japan .............................. 58-076286

[51] Int. Cl.³ .............................................. C22B 13/00
[52] U.S. Cl. .......................................................... 75/77
[58] Field of Search ...................................... 75/77, 24

[56] References Cited

U.S. PATENT DOCUMENTS 1,888,164 11/1932 Freeman ................................. 75/77
3,847,595 11/1974 Liang et al. ............................. 75/77
4,214,897 7/1980 Verhulst et al. ........................ 75/24

Primary Examiner—Melvyn J. Andrews
Attorney, Agent, or Firm—Webb, Burden, Robinson & Webb

[57] ABSTRACT

There is disclosed a continuous direct process of lead smelting comprising a step of blowing a compounded feedstock by means of an oxygen-enriched air or oxygen into a smelting zone containing a molten lead bath with a blast pressure by which the compounded feedstock can penetrate into the molten lead bath, at a temperature at which the oxidation reaction of the lead sulfide concentrate can be sustained, said feedstock containing particulate or powdered lead sulfide concentrate and a flux and further containing a fuel when oxygen-enriched air is used, whereby the lead sulfide is oxidized to form crude lead and slag; and a step of transferring the molten crude lead and the slag formed in said first step to a reduction zone, where the slag is contacted with a reducing agent so as to reduce the lead substances in the slag and return the reduced lead to the crude lead.

9 Claims, 6 Drawing Figures

CONTINUOUS DIRECT PROCESS OF LEAD SMELTING

TECHNICAL FIELD OF THE INVENTION

This invention relates to a continuous direct process of lead smelting. More particularly, this invention relates to a novel process of lead smelting comprising supplying lead concentrate together with oxygen into molten lead by top-blowing.

BACKGROUND OF THE INVENTION

The standard pyrometallurgical process of lead smelting has been a combination of sintering and reduction. This conventional process comprises subjecting lead concentrate (mainly PbS) to desulfurization sintering to form sinter, i.e., sintered lumps of PbO, and reducing the sinter in a smelting furnace with a reducing agent such as coke to form crude lead and slag.

This process has various defects. A compact sintering apparatus suitable for treatment of lead concentrate is not available. Since the sulfur dioxide concentration in the exhaust gas is low, collection of said gas is difficult. As the sintering is performed at a lower temperature, hydrocarbons remain in the exhaust gas, which discolor the sulfuric acid produced from the recovered sulfur dioxide. Therefore, additional purification treatment is required for decoloring the formed sulfuric acid in order to obtain sulfuric acid having commercial value.

Rather recently flash smelting processes have been developed in the field of non-ferrous metallurgy. Typical of these are the Outokumpu process and the Kivcet process, which are now applied to lead smelting. These processes are reviewed in Journal of Metal, December, 1966, p. 1298ff and November, 1982, p. 55ff; CIM Bulletin, November, 1978 p. 128ff, etc., and there are a number of corresponding patents. Also a substantially similar process is known as the Cominco process (Japanese Patent Publication No. 18057/81).

All of these processes substantially comprise blowing downward powdered lead sulfide concentrate together with oxygen or oxygen-enriched air into the combustion zone of a furnace so as to oxidize (burn) the concentrate in the gaseous phase. Thus crude lead and sulfur dioxide are produced. The oxidation of lead concentrate proceeds in accordance with the chemical equation:

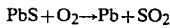

$$PbS + O_2 \rightarrow Pb + SO_2$$

This is an exothermic reaction and therefore is self-sustained once started.

Flash smelting is advantageous in that sintering, which has been a bottleneck in the conventional sintering-reduction process, is not required, fuel need not be used, and therefore the amount of the exhaust gas is small. However, it has the following defects.

1. The reaction of lead sulfide concentrate and oxygen occurs in the gaseous phase and the temperature of the flame (reaction system) reaches 1300° C.–1700° C., and PbO, which severely attacks the refractory, is produced. Thus the furnace wall is highly corroded.

2. The reaction proceeds in the gaseous phase at a higher temperature and volatile lead compounds such as PbO, PbS, etc. are volatilized so that much flue dust is formed. Therefore, the primary yield of metallic lead is very low, and energy consumption is high for treatment of the recycled flue dust. (In this respect the temperature at the top of the smelting furnace in the conventional sintering-reduction process is far lower, and volatilized valuable substances are automatically recovered.)

For the above-described reasons, the flash smelting of lead is not yet successfully employed in a commercial scale.

As a direct process of lead smelting in which the sintering step is eliminated, a process comprising blowing lead sulfide concentrate together with free-oxygen-containing gas into a molten lead in a converter through the tuyere (bottom blowing converter process) is disclosed in U.S. Pat. No. 3,281,237 (1966). In this process, the reactants are blown in through the tuyere, and therefore, there occur rapid exothermic reactions and vigorous agitation in the vicinity of the tuyere, which attack the refractory therearound. Therefore, more than 30% oxygen cannot be contained in the blowing gas, and thus this process cannot be successfully practised.

In Japanese Patent Publication No. 21059/81, Boliden's direct smelting of lead concentrate using a top blowing rotary converter is disclosed. This process comprises top blowing of oxygen-enriched air, but the blast pressure is low and agitation of the melt depends on rotation of the converter. Melting and oxidation of the concentrate and reduction of the slag are carried out in separate steps in the same furnace, and therefore, it is not a continuous process like the converter process.

In Canadian Pat. No. 893,624 (1972) and Japanese Laying-Open Patent Specification No. 47801/75, N.J. Themelis et al's continuous process of lead smelting (bottom blowing single furnace process) is disclosed. In this process, pelletized lead concentrate is introduced into a horizontal furnace at one end thereof, free-oxygen-containing gas is blown into the melt through a plurality of tuyeres provided at the bottom along the length of the furnace so as to oxidize the lead sulfide, and a reducing agent is supplied into the furnace near the other end of the furnace in order to reduce PbO in the slag. This process has the abovementioned defects of the bottom blowing process, and also has the defect of the single furnace process as described below.

Loss of lead into the slag is generally high in the direct smelting process. Therefore, it is necessary to recover the lead from the slag to return into the crude lead melt by reducing the slag. In the above-described flash smelting, this reduction is effected in the same furnace as the flash oxidation in the Kivcet process, and it is effected in a separate furnace in the Outokumpu-process. Designate the former process the "single furnace process" and the latter the "separate furnace process". Then in the single furnace process, it is required that the PbO content in the slag be enhanced and the sulfur content in the crude lead melt be reduced by increasing oxygen activity in one part of a furnace, while the lead in the slag is reduced by decreasing the oxygen activity in the other part. It is very difficult to maintain separate zones remarkably different in the oxygen activity in one furnace. In order to realize such a furnace, the furnace must be of a large scale and complicated auxiliary equipment is required, and a large amount of energy is consumed therefor.

In the field of copper smelting, a continuous copper smelting process, which continuously carries out operations from feeding of copper ore to recovery of crude copper, was established by Mitsubishi Kinzoku Kabushiki Kaisha (Japanese Patent Publication No. 43015/76, U.S. Pat. Nos. 3,890,139 and 3,901,489). In this process, matte and crude copper are produced in three furnaces which are connected with launders. In the first furnace, a smelting furnace, matte and slag are formed by blowing in dried copper concentrate powder and flux powder (siliceous sand, lime, etc.) with oxygen-enriched air through a lance and rapidly melting the feedstock. The formed matte and slag are transferred to the second furnace, a settler, wherein the matte and slag are separated, the slag overflows out of the furnace and is discarded, while the matte is transferred to the third furnace, a reduction furnace. In the third furnace, the matte is reduced to crude copper by supplying a flux (limestone) and oxygen-enriched air through a lance. In a preferred embodiment of this invention, the flux and oxygen-enriched air are blown in in the vicinity of the melt surface.

Although applicability of this process to nickel smelting and cobalt smelting is mentioned in the specification of said patent, the possibility of application of said process to lead smelting was unknown.

We studied prior art processes in detail, and, in view of the fact that PbS considerably dissolves in molten lead, we found that the above-mentioned defect of the flash smelting can be overcome by employment of top blowing as in the above-mentioned copper smelting process; and that the reduction of slag can be more efficiently effected by employment of a separate furnace. Through further research, we have now completed the present invention.

DISCLOSURE OF THE INVENTION

This invention provides a continuous direct process of lead smelting comprising a step of blowing a compounded feedstock by means of an oxygen-enriched air or oxygen into a smelting zone containing a molten lead bath with a blast pressure by which the compounded feedstock can penetrate into the molten lead bath, at a temperature at which the oxidation reaction of the lead sulfide concentrate can be sustained, said feedstock containing particulate or powdered lead sulfide concentrate and a flux and further containing a fuel when oxygen-enriched air is used, whereby the lead sulfide is oxidized to form crude lead and slag; and a step of transferring the molten crude lead and the slag formed in said first step to a reduction zone, where the slag is contacted with a reducing agent so as to reduce the lead substances in the slag and return the reduced lead to the crude lead.

In the present process, lead concentrates of the same grade as those generally used in the prior art processes, that is, those containing 55 wt % or more lead, can be used.

The oxygen-enriched air must contain at least 30 vol % oxygen, preferably not less than 50 vol %, and industrial oxygen can also be used. The most preferred oxygen concentration is 50-70% by volume. When industrial oxygen is not used, some fuel material (carbon, hydrocarbon substances, etc.) must be added to the concentrate and flux. The preferred fuel is particulate or powdered coal or coke. Gaseous fuel such as natural gas, coal gas, LPG, etc. can be used, but it is not practical since a lance of a complicated structure is required. The amount of fuel must not be excessive relative to the amount of the lead concentrate and oxygen.

Usable fluxes include siliceous sand, lime, and iron oxides if necessary. The criterion for selecting fuel is described in detail hereinafter.

When smelting is started, it is necessary to charge molten crude lead in the smelting furnace beforehand, and also to raise the temperature to at least 1,000° C., preferably around 1,050° C. There is no need to raise the temperature any higher.

The smelting furnace used for practising the present invention is known. This may be substantially the same as the furnace disclosed in the above-cited Japanese Patent Publication No. 43015/76. That is to say, this is a furnace constructed with known refractory materials, the ceiling of which is provided with a port for inserting a lance through which lead sulfide concentrate, flux and oxygen-containing gas are blown into the molten lead, an exhaust port and a burner for preheating the furnace to the operation temperature. The furnace, of course, has a well from which the formed crude copper and slag are drawn out. The well is provided with a means for regulating the residence time of slag in the furnace.

The reduction furnace is not particularly limited by specific conditions, although an electric furnace, which is easy in regulation of temperature and inside atmosphere, is preferred. Those skilled in the art can design this furnace without further detailed explanation. The reducing agent used in this furnace is coke, hard coal (anthracite), etc., but it is not limited thereto. There is no particular limitation on the amount of fuel to be used, and there is no harm if an excess amount of fuel is used. The two furnaces are connected with a launder. This is well known among those skilled in the art and no particular explanation is required.

The apparatus by which lead sulfide concentrate, flux and fuel are supplied into the melt by virtue of the suction effect produced by blowing oxygen-enriched air is also known. This is described in Japanese Patent Publication No. 19965/78 and No. 35449/80 for instance.

BRIEF DESCRIPTION OF THE ATTACHED DRAWINGS

Now the invention will be described in detail with reference to the attached drawings.

DETAILED DESCRIPTION OF THE PREFERRED EMBODIMENT

Figure 1:
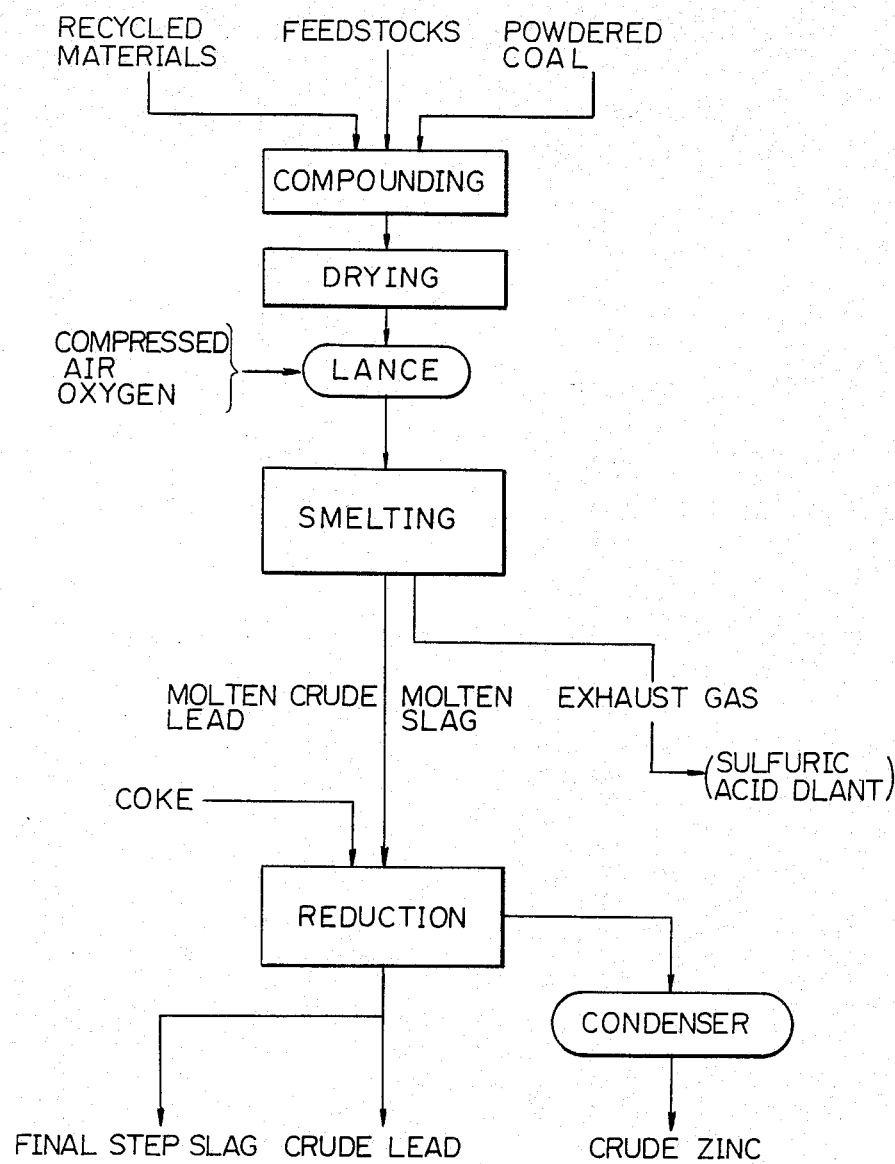
FIG. 1 is a flow chart which shows the steps of a first embodiment of the present invention.

FIG. 1 is a flow chart showing steps of a standard embodiment of the present invention. The feedstocks, that is, lead concentrate mainly comprising lead sulfide, recycled materials such as flue dust, dross, etc., and fluxes such as silica, lime, iron oxides, etc. are comminuted into particles or powder, preferably into particles of 10 mm or less in diameter, mixed in a predetermined proportion and dried. The dried mixture (hereinafter called "compounded feedstock") preferably should not contain more than 1% moisture. The dried compounded feedstock is blown into the molten bath in the furnace together with oxygen-enriched air through a lance. The feedstock is rapidly melted and iron, zinc, etc. in the concentrate are oxidized by oxygen and form a slag. The contained sulfur is converted to $SO_2$ and is exhausted. This step is hereinafter called "smelting step".

Figure 2:
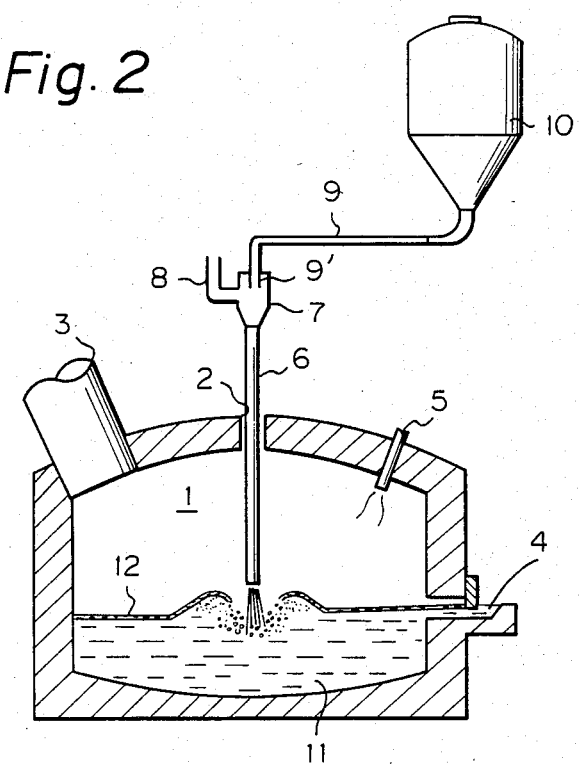
FIG. 2 is a schematic cross-sectional view of the smelting furnace used for practising the present invention.

The furnace in which the smelting step is conducted can be constructed as a stationary furnace of a simple structure. An example thereof is shown in FIG. 2. As shown in FIG. 2, the furnace comprises a furnace body 1, in the ceiling of which a lance port 2, an exhaust port 3, a burner 5 which is used to preheat the furnace and to maintain the furnace temperature are provided. In the side wall, a well 4 for drawing the formed molten crude lead and the slag is provided. The lance comprises a lance pipe 6 and a lance head 7. To the lance head compressed air is supplied from a blast pipe 8, and the compounded feedstock is supplied from a hopper 10 through a transport duct 9. The lower end 9' of the transport duct extends into the center of the lance head 7, the compounded feedstock and the oxygen-enriched air blast are combined here and blown into a molten bath comprising slag 12 and crude lead 11.

Molten metallic lead dissolves a considerable amount of lead sulfide, and the conversion from lead sulfide to lead and sulfur dioxide takes place in the molten lead. The present invention essentially differs from the flash smelting in this respect, and thus loss of lead is extremely small and the reaction is conducted at a lower temperature and therefore, corrosion of the refractory wall of the furnace is reduced.

The lance pipe 6 is a simple pipe made of a heat-resisting steel or stainless steel free from any complicated structural components such as water-cooling jacket. The lance pipe is exposed to a high temperature such as 1,000°–1,300° C. Therefore, the flow rate of the combined compounded feedstock and blast gas must be maintained at a degree such that a blast is provided which is sufficient to cause the feedstock to enter into the molten bath to prevent back firing into the lance pipe and to cool the lance pipe sufficiently in order to guarantee a long practical life of the lance. That is, a sufficient flow rate must be maintained so that the outside surface of the lance pipe is cooled and splash of the molten bath deposits and solidifies on the surface of the pipe to provide a covering. Such a flow rate is 100 m/sec or higher, preferably 150–300 m/sec as the normal pressure and normal temperature.

The height of the lance, that is, the distance between the lance end and the bath surface is preferably 100–600 mm for the above-mentioned jetting speed. If the distance is too short, the lance end is consumed by splashing molten bath, and if it is too long, penetration of the compounded feedstock into the bath and thus oxygen utilization efficiency are reduced.

Also it must be considered in setting the flow rate of the lance blast that a hot flame resulting from oxidation of the feedstock and burning of the fuel is not formed before the combined compounded feedstock and blast gas hit the bath surface. This condition is satisfied within the above-mentioned flow rate range. The combined feedstock and blast gas blown at the above-mentioned flow rate penetrate sufficiently into the molten bath and are dispersed therein, and reactions such as decomposition and burning of the fuel, dissolving and oxidation of the feedstock rapidly proceed. Heat energy is produced by the oxidation reaction at the spot where heat energy is required for melting of the feedstock, and the reactions proceed at that spot which is surrounded by the melt. Therefore, heat is rapidly transferred and thus heat radiation from the hot flame does not directly irradiate the furnace wall.

The lead concentrate blown in together with oxygen or oxygen-enriched air, flux and fuel is oxidized in the molten lead and becomes lead by the reaction:

$$PbS + O_2 \rightarrow Pb + SO_2 \tag{1}$$

Fuel burns and maintains the reaction temperature.

When solid fuel of a larger size is used, the combustion is not always finished immediately below the lance. In such a case, unburned combustible particles are dispersed on the surface of the molten bath by virtue of movement of the molten bath caused by the lance jet. The dispersed particles are decomposed by the heat of the bath and react with metal oxides in the slag to form CO, $H_2$, etc. The thus produced combustible gases are oxidized near the bath surface by the oxygen existing in the furnace. This is effective for making the temperature distribution in the furnace uniform.

$$C + PbO \text{ (in slag)} \rightarrow Pb + CO \tag{2}$$

$$CO + \tfrac{1}{2}O_2 \rightarrow CO_2 \tag{3}$$

$$H_2 + \tfrac{1}{2}O_2 \rightarrow H_2O \tag{4}$$

The fuel is introduced at a rate necessary and sufficient for maintaining a proper operation temperature. The oxygen-enriched air must be supplied in an amount necessary and sufficient for burning the fuel and oxidizing all of the sulfur, iron and zinc in the feedstock and further a portion of the lead so that the amount of PbO in the slag reaches the degree specified hereinafter. The oxygen utilization efficiency is 85–95%.

Some portions of the concentrate components react with oxides in the slag and a portion of the PbS dissolved in the molten lead is decomposed into Pb and S

$$FeS + PbO \text{ (in slag)} \rightarrow PbS + FeO \text{ (in slag)} \tag{5}$$

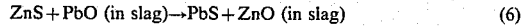
$$ZnS + PbO \text{ (in slag)} \rightarrow PbS + ZnO \text{ (in slag)} \tag{6}$$

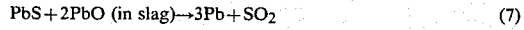
$$PbS + 2PbO \text{ (in slag)} \rightarrow 3Pb + SO_2 \tag{7}$$

$$PbS + Pb + S \text{ (in crude lead)} \tag{8}$$

Although a portion of the oxygen in the lance blast is consumed for burning the fuel, most of it directly reacts with the molten bath to oxidize free sulfur therein and also to oxidize a portion of the metallic lead to PbO, and oxidizes lower oxides in the slag if there are any therein.

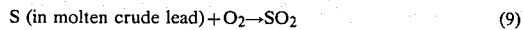
$$S \text{ (in molten crude lead)} + O_2 \rightarrow SO_2 \tag{9}$$

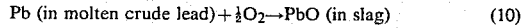
$$Pb \text{ (in molten crude lead)} + \tfrac{1}{2}O_2 \rightarrow PbO \text{ (in slag)} \tag{10}$$

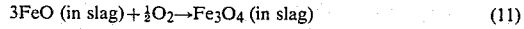
$$3FeO \text{ (in slag)} + \tfrac{1}{2}O_2 \rightarrow Fe_3O_4 \text{ (in slag)} \tag{11}$$

As has been described, direct reaction with the molten bath is predominant in the reactions caused by the lance blast. In this connection, in order to use oxygen at a high utilization efficiency, it is necessary to make the thickness of the slag layer as thin as possible so that good contact of the lead bath and the lance blast can be achieved. For the fulfillment of the above-mentioned conditions, the thickness of the slag layer should be not more than 250 mm, preferably 50–150 mm.

If a slag mainly comprising iron oxides and silicates is formed, the smelting is carried out at 1200°–1300° C. At such a high temperature, volatilization of PbO and PbS is promoted and a large amount of flue dust is produced. Thus, the primary yield of metallic lead is lowered and heat loss caused by treatment of recycled flue dust increases. Therefore, it is desirable to form a low melting slag so that the smelting can be conducted at 1000°–1100° C.

It has been empirically found that a slag containing a large amount of PbO is low melting. But the correlation of the PbO content and other slag components such as CaO, $SiO_2$, etc. with respect to melting temperature of the slag is not yet elucidated.

It has been considered that the CaO content in the slag at the last step of lead smelting should be 15–25% in order to minimize the loss of lead into the slag, and that the contents of $SiO_2$ and iron oxides should be controlled so that the melting point is as low as possible. Zinc oxide (ZnO) is one of the principal components of the slag, but this substance raises the melting point of the slag. Therefore, the amount of the flux is regulated so that the ZnO content of the slag is around 20% at the highest. Needless to say, the composition of the slag formed at the last step must be the same as that in ordinary lead smelting, and the total amount of the flux to be added for formation of slag in the first step of the process of the present invention should be determined so that it does not exceed the amount necessary for formation of the last step slag.

Figure 4:
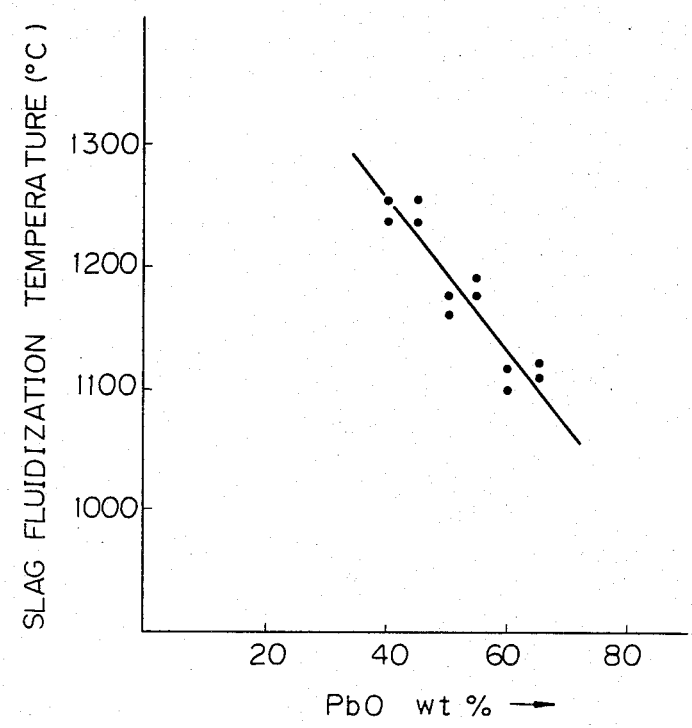
FIG. 4 is a diagram showing the relationship between the fluidization temperature of the smelting furnace slag and the PbO content of said slag.

We checked the melting points of slags to be formed ordinarily as the last step slag, which contained 15–20 wt % of ZnO. About 25 wt % (as Fe) of iron oxide, 18–23 wt % of CaO and 20–25 wt % of $SiO_2$, and to which PbO was added. Iron in the slag was mostly trivalent and only a portion was divalent. The results are shown in FIG. 4, in which the fluidization temperature of slag is represented on the ordinate. The term "fluidization temperature" means the temperature at which a slag exhibits a fluidity sufficient for starting smelting operation, and it does not correspond to the strictly defined melting point. From the results, it is apparent that the smelting furnace can be operated at about 1100° C. if the PbO content of the slag is increased to around 60 wt %. A typical example of such slags contains 60 wt % PbO, 8.8 wt % ZnO, 8.6 wt % $SiO_2$, 7.9 wt % CaO and 14.7 wt % $Fe_3O_4$ provided that the total of the five mentioned components is 100%.

Figure 5:
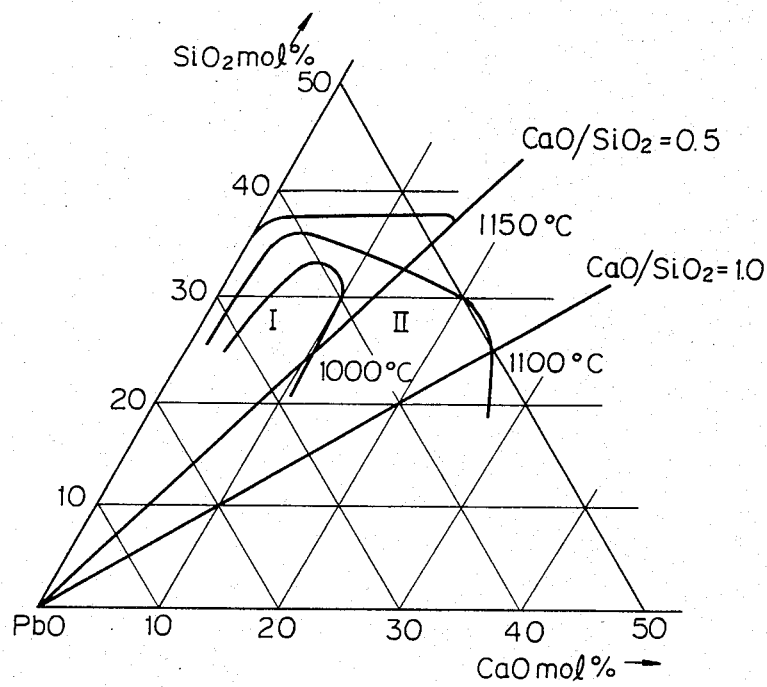
FIG. 5 is a ternary diagram for the three component system $PbO$—$CaO$—$SiO_2$, in which the fluidization temperatures of the smelting furnace slag are plotted. (The diagram is scaled with the sum of the amounts of any two of the three components as 100%.)

In order to suppress volatilization of lead, however, the operation temperature should be not higher than 1100° C., preferably should be around 1000° C. We checked fluidization temperatures of slags which contained the above-mentioned components as the principal components, wherein the amounts of iron oxides and other minor components to be formed were supposed to be 15–16 wt % for $Fe_2O_3$ representing iron oxides, and 9–10 wt % for ZnO and the $SiO_2$ to CaO ratio was varied. The results are shown in FIG. 5. FIG. 5 is a PbO—CaO—$SiO_2$ ternary diagram, wherein the sum of the three components is 100 mole %. Isotherms of slag fluidization temperatures are indicated therein.

The $CaO/SiO_2$ weight ratio for lead smelting is approximately 1:1 in the ISP ("Imperial Smelting" Process), and 0.5–0.9:1 in the ordinary blast furnace process. Published $SiO_2$—CaO—FeO ternary diagrams show the fact that the melting point of the slag is low when the $CaO/SiO_2$ ratio is in the above-mentioned range. In slags containing a large amount of PbO, the above-mentioned compositions do not always coincide with the domain in which the melting point of the slag is low. If the smelting is conducted at 1000° C., the proper composition of the PbO—CaO—$SiO_2$ system is: not more than 35 mole % $SiO_2$, 3–12 mole % CaO and the rest PbO. When operated at 1100° C., the composition is: $SiO_2/(PbO+SiO_2)<0.4$ and $CaO/(PbO+CaO)<0.4$. The former composition range is Domain I and the latter is Domain II in FIG. 5. That is to say, with a slag falling within Domain I, smelting can be carried out at 1000° C. When the concentrate contains a large amount of slag-forming ingredients and a slag falling within Domain I cannot be formed by regulating the amount of the flux to be added, the smelting can be carried out at 1100° C. by arranging for the formation of a slag in Domain II as the second best measure.

The produced slag and crude lead form the molten bath. The crude lead and slag drawn out from the well 4 as they increase, a necessary amount being allowed to remain in the furnace.

Figure 3:
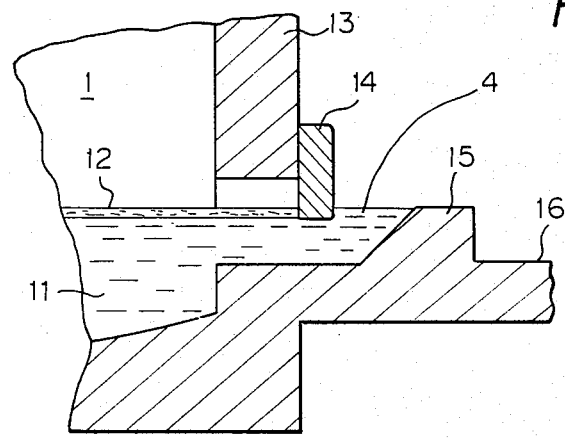
FIG. 3 is a schematic elevational crosssectional view of the well of the smelting furnace.

FIG. 3 shows details of the well. In FIG. 3, the well comprises a part of the side wall of the furnace and an overflow dam 15 and communicate with a launder leading to the reduction furnace, a part of which is shown at 16. The well is provided with a stopper 14 which regulates the opening of the side wall of the furnace. The stopper is set so that the lower edge thereof is lower than the upper edge of the overflow dam by 10–50 mm. By so setting, the thickness of the slag becomes 50–150 mm. This is remarkably thinner in comparison with the slag thickness of 300–500 mm in the case where the crude lead and the slag are separately tapped. As a result, good contact of the lance blast and the molten lead is well maintained without the lance end being immersed in the molten bath, and thus high oxygen utilization efficiency is achieved and operation with a rather low blast pressure is made possible. This means that energy consumption is reduced and consumption of the lance decreases.

The crude lead and slag drawn out of the smelting furnace are transferred to a reduction furnace. The reduction furnace is preferably an electric furnace. A reducing agent such as coke or coal is supplied for reduction of PbO in the slag and simultaneously a lime flux is added for regulation of the slag composition. It is desirable to enhance the CaO content in the slag to 15–20% in order to lower the PbO content to 1–2%. After the reduction is completed, the slag is discarded and the crude lead is transferred to a refining step.

It is possible to reduce not only PbO but also ZnO in the slag by maintaining a reducing atmosphere in the furnace. In this case, zinc can be recovered as zinc-rich flue dust by using a so-called fuming furnace, into which a reducing agent is blown in through a tuyere so that zinc is reduced and volatilized. Or, metallic zinc can be recovered by using an air tight electric furnace, in which ZnO is reduced with coke and the volatilized zinc is collected by a condenser. In either case, not merely zinc can be recovered, but also a secondary benefit is brought about that the amount of the flux to be added is also reduced and thus energy consumption is reduced, too, because the amount of the produced slag is reduced.

The exhaust gas of the smelting furnace exits the furnace through the exhaust port 3. The exhaust gas in the process of the present invention can be used for production of sulfuric acid, since the $SO_2$ content thereof is high. As the amount of the exhaust gas is small, the $SO_2$ content is high, and all the organic substances have been decomposed and burned. Therefore, sulfuric acid without discoloration can be economically produced.

In another aspect of the process of the present invention, it is also possible to separately collect the crude lead obtained in the smelting step and the crude lead obtained in the reduction step by separating slag and crude lead in the smelting step and transferring only the slag to the reduction step. This procedure is advantageous in the case where the lead concentrate has a high content of such impurities as arsenic, antimony, copper, etc. In such a case, speiss may be formed in the reduction step, and precious metals such as gold and silver are often contained in the speiss and the actual yield of these metals is lowered. In the smelting step of the process of the present invention, the oxygen potential is high and almost all arsenic and antimony are transferred to the slag as oxides, so that the contents of these elements in the crude lead are low. On the other hand, most of precious metals are contained in the crude lead. Therefore, Au, Ag, etc. are concentrated in the smelting furnace crude lead while the contents of As and Sb are low in said crude lead.

As As and Sb are concentrate in the slag, speiss is formed along with crude lead in the reduction step. But the contents of Au and Ag are low in this crude lead. Therefore, loss of these precious metals is small.

Figure 6:
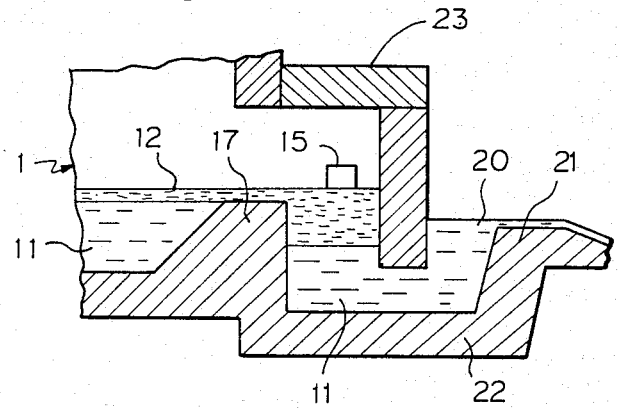
FIG. 6 is a cross-sectional view of a separation well of the smelting furnace showing the structure of the well for separating crude lead and slag.

In order to carry out this aspect of the present invention, the structure of the smelting furnace must be modified. FIG. 6 shows an example of the structure of a modified furnace. A port is provided in the side wall of the furnace by an overflow dam 17, and a drawing well is formed by an extended bottom 22 and a second overflow dam 21. A canopy 23 of refractory is provided so that a syphon passage is formed in the well. A slag tapping port 15 is provided at a suitable position in the canopy. The crude lead 11 and slag 12, which overflow the first dam 17, are separated in the well. The slag is drawn out through the tapping port 15 and is transferred to the reduction furnace through a launder. The separated crude lead proceeds through the syphon passage and overflows the second dam 21 and is transferred to a refining step. The level difference between the slag tapping port 15 and the second overflow dam 21 must be set so that the thickness or depth of the slag in the well is sufficient for the crude lead and the slag to be perfectly separated, that is, at least 20 cm.

EXAMPLE 1

Into the molten bath in a smelting furnace of 70 ton capacity as described above, a compounded feedstock containing 26 kg on the dry basis of siliceous sand (92% $SiO_2$), 40 kg on the dry basis of iron ore (containing 56% Fe), and 36 kg on the dry basis of powdered coal per 1000 kg of dried lead concentrate A, the composition of which is indicated in Table 1, is fed at a rate of 7.5 tons/hr by means of an oxygen-enriched air containing 60 vol % oxygen supplied at a rate of 2000-2200 $Nm^3/hr$ through a lance 2.5 inches (6.35 cm) in the outer diameter made of 18-8 Cr-Ni stainless steel.

The furnace has been preheated to 1000°-1050° C. charged with 50 tons of molten lead. The lance is inserted downward through the lance port in the furnace ceiling. The lance end is kept at about 20-50 cm from the still bath surface. The gas flow rate in the lance pipe is about 170 m/sec as converted to the value at normal temperature and normal pressure. The blown-in compounded feedstock is guite efficiently collected in the molten bath, the carried-over loss of the compounded feedstock being about 1 wt % when calculated back from the contents of non-volatile components such as $SiO_2$, iron oxides, etc. in the flue dust. There is no rise in the furnace atmosphere temperature, since combustion of the coal in the compounded feedstock takes place immediately below the lance nozzle. In order to regulate the furnace temperature, Bunker C heavy oil is burned at a rate of 50 l/hr and the temperature of the melt is maintained at 1000°-1050° C.

The PbO content of a slag falling within Domain I is not less than about 1.5 times the total amount of CaO and $SiO_2$ when expressed in mole. This corresponds to at least 61.5 wt % PbO in the formed slag. The composition of the smelting furnace slag is shown in Table 2. The contents of the other components are values when the PbO content is regarded to be 61.5%.

The lance blast is regulated so that the PbO content in the slag is around 62%. The oxygen utilization efficiency calculated from the slag composition was 85-90%. The temperature of the smelting furnace exhaust is 1000°-1100° C., and the $SO_2$ content thereof is 23-27 vol % on the dry gas basis. The exhaust gas is sent to a sulfuric acid plant after drying and dust collection. The total amount of the collected dust is 15-20 wt % of the total amount of the used lead concentrate. The dust contained about 65 wt % Pb and the contents of $SiO_2$, Fe, etc. are very small.

The operation of the reduction furnace is started after it has been charged with about 5 tons of the smelting furnace slag and is preheated to about 1200° C. After the introduction of the crude lead and the smelting furnace slag is started, lump coke is supplied so that some unreacted coke remains on the molten bath surface all the time. Simultaneously, limestone containing 54 wt % CaO is introduced at a rate of 300-360 kg/hr (49 kg/ton concentrate). The produced crude lead is continuously drawn out by way of syphon tapping, and is transferred to a refining kettle. The slag is tapped at every 3-4 hours from the opposite side of the introduction port of the smelting furnace slag. The composition of the reduction furnace slag (the final step slag) is indicated in Table 2. The S content in the crude lead is 0.2-0.3 wt %.

EXAMPLE 2

Into the molten bath in the smelting furnace used in Example 1 a compounded feedstock, which contains 16 kg on the dry basis of siliceous sand (92 wt % $SiO_2$), 10 kg on the dry basis of limestone (containing 51 wt % CaO), and 27 kg on the dry basis of powdered coal (7100 kcal/kg in heat generation) per 1000 kg of lead concentrate B (the composition of which is indicated in Table 1) and which has been dried to a moisture content of not more than 1%, is continuously fed at a rate of 7.4 tons/hr by means of oxygen-enriched air containing 60 vol % oxygen supplied at a rate of 2500-2600 $Nm^3/hr$ through a lance. The lance and the operation thereof are the same as in Example 1. The furnace temperature is controlled so as to be 1050°-1100° C. by means of a burner. The exhaust gas temperature was 1050°–1150° C.

The amount of the flux is adjusted so that the $SiO_2$:CaO mole ratio of the formed smelting furnace slag is 5:1. Also, the lance blast rate is controlled so that the PbO content of the slag is 53–60 wt %, since the calculated value of the PbO content with which the mole ratio PbO:($SiO_2$+CaO) became 3:2 is 53%. The target composition of the smelting furnace slag is indicated in Table 3. The formed crude lead and slag are conveyed to the reduction furnace through a launder. The collected flue dust is recycled to the feedstock. The exhaust gas is sent to the sulfuric acid plant. The composition of the slags is indicated in Table 3.

In the reduction furnace, an excess amount of coke was supplied in order to reduce not only PbO but also ZnO. Also limestone is added at a rate of 50–60 kg/hr in order to control the slag composition. The crude lead is continuously drawn out through the syphon tap and the slag is drawn out at every 10–12 hours. The composition of the final step slag is indicated in Table 3. The exhaust gas which contains vapor of metallic zinc is burned by introducing air. The zinc is recovered as a ZnO-rich flue dust, the yield is 85–90 wt %.

TABLE 1

| Composition of lead concentrate | | | | | | | | |
|---|---|---|---|---|---|---|---|---|
| Pb | Zn | Fe | Cu | CaO | $SiO_2$ | $Al_2O_3$ | MgO | S |
| A 76.0 | 2.3 | 1.3 | — | 0.7 | 0.4 | 0.1 | 0.5 | 14.4 |
| B 59.3 | 6.5 | 5.0 | 1.5 | 0.1 | 2.0 | — | — | 17.0 |

TABLE 2

| Composition of slags of smelting furnace and reduction furnace when concentrate A was used | | | | |
|---|---|---|---|---|
| | PbO | ZnO | Fe | CaO | $SiO_2$ |
| Smelting f. | 60~65 | 8.9 | 11.1 | 2.2 | 8.7 |
| Reduction f. | 2~3 | 17~19 | 25~27 | 20~23 | 20~22 |

TABLE 3

| Composition of slags of smelting furnace and reduction furnace when concentrate B was used | | | | |
|---|---|---|---|---|
| | PbO | ZnO | Fe | CaO | $SiO_2$ |
| Smelting f. | 53~60 | 18.8 | 11.6 | 1.4 | 8.0 |
| Reduction f. | 2 | 8~9 | 36~38 | 25~28 | 15~18 |

EXAMPLE 3

A smelting furnace which is provided with a separation well as shown in FIG. 6 being used, concentrate B is treated by the same procedure as in Example 2. The crude lead formed in the smelting furnace (smelting furnace crude lead) is directly transferred to the refining step. Only the slag is conveyed to the reduction furnace and it is treated in the same way as in Example 2. The produced lead (reduction furnace crude lead) was refined separately from the smelting furnace crude lead.

The yield of the crude lead is about 60–65 wt % in the smelting furnace, and about 40–35 wt % in the reduction furnace. The compositions of the produced crude lead are shown in Table 4. Among the ingredients of concentrate B not indicated in Table 1 are: Ag 1500 ppm, As 0.2%, Sb 0.5% and Bi 0.3%.

TABLE 4

| Compositions of separately tapped crude leads | | | | | |
|---|---|---|---|---|---|
| | Pb (%) | Ag (ppm) | As (%) | Sb (%) | Bi (%) |
| Smelting f. | 98.5 | 3800 | 0.05 | 0.03 | 0.4 |
| Reduction f. | 95.8 | 160 | 0.75 | 2.1 | 0.2 |

As the As content is low, there is no formation of speiss even in the reduction furnace. The Ag content in the reduction furnace slag is about 2 ppm. The As content in the reduction furnace slag when the smelting furnace crude lead is not separately tapped is about 30 ppm.

According to the process of the present invention, the smelting step and the reduction step are separately conducted and neither step is influenced by the other. Therefore, each step can be easily controlled and independently carried out at maximum efficiency. The whole installation can be constructed on a smaller scale.

The furnace is stationary, and thus no complicated mechanical structure is required for rotation, or any other movement. Further the furnace can be connected to a flue in a gas-tight manner, and thus no leakage of exhaust gas occurs.

The feedstock is introduced through a top blowing lance, oxidation of the feedstock and combustion of the fuel take place in the interior of the bath or in the vicinity of the bath surface immediately below the lance nozzle. Thus, the reaction heat is transmitted to the melt rapidly and completely, and therefore, the amount of radiation heat received by the furnace wall refractory is extremely reduced in comparison with the case where the oxidation reaction occurs in the gaseous phase. The furnace is free from the local attack as seen in furnaces having tuyeres, and thus the furnace life is remarkably prolonged.

The lance is a simple pipe requiring no complicated water-cooling structure, and therefore, is of low cost and can be easily operated.

In the lead smelting, it had been intended to raise the PbO content in the slag composition. We further studied the relation between the contents of PbO, $SiO_2$ and CaO and we found a slag composition range with which the smelting can be carried out at a bath temperature around 1000° C. As a result, generation of dust is suppressed to 20 wt % of the feedstock or less.

In the process of the present invention, the oxygen utilization efficiency in the smelting furnace can be enhanced without need to give special consideration to the life of the furnace, and thus the $SO_2$ content in the exhaust gas is remarkably increased and the gas can be easily treated in an ordinary sulfuric acid plant. The exhaust gas of the reduction furnace is separately treated, and therefore, the exhaust of the smelting furnace is not diluted.

We claim:

1. A continuous direct process of lead smelting by top blowing comprising blowing through a lance pipe at a flow rate of at least 100 m/sec a compounded feddstock containing particulate or powdered lead sulfate concentrate and flux and also containing fuel when oxygen-enriched air is used and a stream of oxygen-enriched air or oxygen into a smelting zone containing a molten lead bath so as to penetrate said compounded feedstock through a slag layer and into said molten lead bath which has been preheated to a temperature at which the oxidation reaction of said lead sulfide concentrate is sustained, whereby said oxidation of lead sulfide is avoided in a zone maintained at 1000° to 1300° C. above said bath and said lead sulfide being oxidized in said molten lead bath to form molten crude lead and slag, transferring said molten crude lead and slag to a reduction zone and contacting said slag in said reduction zone with a reducing agent to reduce the lead substances in said slag and to return the reduced lead to the crude lead.

2. The continuous direct process of lead smelting defined in claim 1 wherein said smelting zone is a smelting furnace having a lance, a burner, an exhaust port and a well for tapping said molten crude lead and said slag, and an electric furnace forming a reaction zone, preheating said smelting furnace atmosphere and said molten lead bath contained therein to a temperature at which the oxidation reaction of lead sulfide can be maintained, and blowing said compounded feedstock in through said lance by means of said oxygen-enriched air or oxygen blast to bring said compounded feedstock into said molten lead bath by the suction effect of said oxygen-enriched air or oxygen and transferring the formed crude lead and slag to said electric furnace to reduce the lead substances in the slag to lead.

3. The continuous direct process of lead smelting defined in claim 1 wherein oxygen-enriched air having an oxygen concentration of 50–70 vol % is blown into said molten lead bath in said smelting zone and the fuel in said oxygen-enriched air is powdered or particulate coal or coke, and said reducing agent is coke or hard coal.

4. The continuous direct process of lead smelting defined in claim 1 wherein of the crude lead and the slag formed in said smelting zone, transferring only the slag to said reduction zone and contacting said slag with a reducing agent.

5. The continuous direct process of lead smelting defined in claim 1 wherein the zone above the bath is maintained at a temperature no greater than 1100° C.

6. The continuous direct process of lead smelting defined in claim 1 wherein the flow rate is 150–300 m/sec.

7. The continuous direct process of lead smelting defined in claim 1 wherein a distance between the lance and the bath is 100–600 mm.

8. The continuous direct process of lead smelting defined in claim 1 wherein the slag layer is not more than 250 mm in thickness.

9. The continuous direct process of lead smelting defined in claim 8 wherein the slag layer is 50–150 mm in thickness.

* * * * *

UNITED STATES PATENT AND TRADEMARK OFFICE
CERTIFICATE OF CORRECTION

PATENT NO. : 4,514,223

DATED : April 30, 1985

INVENTOR(S) : Shizuo Kawakita et al.

It is certified that error appears in the above-identified patent and that said Letters Patent is hereby corrected as shown below:

Column 6 Line 54 "+" (first occurrence) should read -- $\rightarrow$ --.

Column 10 Line 17 "1/hr" should read -- $\ell$ hr --.

Claim 1 Column 12 Line 59 "feddstock" should read --feedstock--.

Claim 1 Column 12 Line 60 "sulfate" should read --sulfide--.

Signed and Sealed this

Eighth Day of October 1985

[SEAL]

Attest:

DONALD J. QUIGG

Attesting Officer

Commissioner of Patents and Trademarks—Designate